(12) United States Patent
Finkelshtain et al.

(10) Patent No.: US 7,507,491 B2
(45) Date of Patent: Mar. 24, 2009

(54) SELF-CONTAINED FUEL CELL AND CARTRIDGE THEREFOR

(75) Inventors: Gennadi Finkelshtain, Shoham (IL); Mark Estrin, Meuhad (IL); Rami Hashimshony, Pardes Hana (IL)

(73) Assignee: More Energy Ltd., Yehud (IL)

( * ) Notice: Subject to any disclaimer, the term of this patent is extended or adjusted under 35 U.S.C. 154(b) by 720 days.

(21) Appl. No.: 10/796,305

(22) Filed: Mar. 10, 2004

(65) Prior Publication Data

US 2004/0241521 A1 Dec. 2, 2004

Related U.S. Application Data

(60) Provisional application No. 60/453,218, filed on Mar. 11, 2003, now abandoned.

(51) Int. Cl.
*H01M 2/02* (2006.01)
*H01M 2/08* (2006.01)

(52) U.S. Cl. .............. 429/34; 429/35; 429/38; 429/32

(58) Field of Classification Search .......... 429/34, 429/35, 36, 32, 46, 27, 12
See application file for complete search history.

(56) References Cited

U.S. PATENT DOCUMENTS

| | | | | |
|---|---|---|---|---|
| 3,288,644 | A | * | 11/1966 | Delfino .............. 429/36 |
| 3,365,333 | A | * | 1/1968 | Gerhard et al. .......... 429/15 |
| 3,365,334 | A | * | 1/1968 | Thellmann .......... 429/26 |
| 3,880,809 | A | * | 4/1975 | Finelli ............... 525/440 |
| 4,562,123 | A | * | 12/1985 | Shimizu et al. ........ 429/27 |
| 5,599,640 | A | | 2/1997 | Lee et al. |
| 5,804,329 | A | | 9/1998 | Amendola |
| 2002/0015869 | A1 | | 2/2002 | Suda |
| 2002/0083640 | A1 | | 7/2002 | Finkelshtain et al. |
| 2002/0094459 | A1 | | 7/2002 | Finkelshtain et al. |
| 2002/0142196 | A1 | | 10/2002 | Finkelshtain et al. |
| 2002/0197522 | A1 | * | 12/2002 | Lawrence et al. ...... 429/34 |
| 2003/0082427 | A1 | | 5/2003 | Prasad et al. |
| 2003/0099876 | A1 | | 5/2003 | Finkelshtain et al. |
| 2003/0207162 | A1 | * | 11/2003 | Reiser ............... 429/22 |
| 2004/0175599 | A1 | | 9/2004 | Ricks et al. |

FOREIGN PATENT DOCUMENTS

| | | |
|---|---|---|
| JP | 2004-172111 | 6/2004 |
| JP | 2004-207208 | 7/2004 |
| JP | 2004-247226 | 9/2004 |
| RU | 2230400 | 6/2004 |

OTHER PUBLICATIONS

Machine translation of JP2004172111 no date available.

* cited by examiner

*Primary Examiner*—Raymond Alejandro
(74) *Attorney, Agent, or Firm*—Greenblum & Bernstein, P.L.C.

(57) ABSTRACT

Fuel cell including a casing, a cathode having a first surface and a second surface, at least part of the second surface being exposed to the atmosphere, an anode having a first surface and a second surface, a first chamber configured to retain liquid fuel, wherein the first chamber is defined at least partially by the first surface of the anode, and a second chamber configured to retain liquid electrolyte, wherein the second chamber is defined at least partially by the second surface of the anode and the first surface of the cathode, wherein the fuel cell is configured to be sealed in a substantially liquid-tight manner during at least a portion of its service life. A cartridge can be connected to the fuel cell. This Abstract is not intended to define the invention disclosed in the specification, nor intended to limit the scope of the invention in any way.

79 Claims, 13 Drawing Sheets

SELF-CONTAINED FUEL CELL AND CARTRIDGE THEREFOR

CROSS-REFERENCE TO RELATED APPLICATIONS

The present application claims the benefit of U.S. Provisional Patent Application No. 60/453,218, filed on Mar. 11, 2003 under 35 U.S.C. §119(e), now abandoned, the disclosure of which is expressly incorporated by reference herein in its entirety.

BACKGROUND OF THE INVENTION

1. Field of the Invention

The present invention relates to a self-contained fuel cell and a cartridge therefor. The invention also relates to a refillable fuel cell and a refilling device.

2. Discussion of Background Information

An electrochemical fuel cell is a device that converts the energy of a chemical reaction into electricity. Among the advantages that fuel cells have over other sources of electrical energy are a high efficiency and environmental friendliness. Although fuel cells are increasingly gaining acceptance as electrical power sources, there are technical difficulties that prevent the widespread use of fuel cells in many applications, especially mobile and portable applications. A fuel cell produces electricity by bringing a fuel into contact with a catalytic anode while bringing an oxidant into contact with a catalytic cathode. When in contact with the anode, the fuel is oxidized at catalytic centers to produce electrons. The electrons travel from the anode to the cathode through an electrical circuit connecting the electrodes. Simultaneously, the oxidant is catalytically reduced at the cathode, consuming the electrons generated at the anode. Mass balance and charge balance are preserved by the corresponding production of ions at either the cathode or the anode and the diffusion of these ions to the other electrode through an electrolyte with which the electrodes are in contact. As the fuel cell produces electricity, the liquid fuel and the electrolyte are gradually exhausted of their useful components. Consequently, fresh liquid fuel must continuously be supplied to known fuel cells. In other words, at least during operation, liquid (and other) fuel cells are open systems, because they depend on the constant supply of fresh fuel (and fresh electrolyte) from the exterior. It would be very desirable to have available a fuel cell that is capable of being operated in a substantially sealed state, similar to a battery. It would also be desirable to be able to reuse this sealed fuel cell after the liquid fuel and/or the liquid electrolyte are exhausted.

SUMMARY OF THE INVENTION

The present invention provides a fuel cell comprising a casing and, within the casing (i.e., partially or completely within the casing), a cathode having a first surface and a second surface, at least part of the second surface being exposed to the atmosphere, and an anode having a first surface and a second surface. The fuel cell further comprises at least one first chamber for holding fuel and at least one second chamber for holding electrolyte. The first chamber is defined at least partially by the first surface of the anode and the second chamber is defined at least partially by the second surface of the anode and the first surface of the cathode. This fuel cell is configured to be sealed in a substantially liquid-tight manner during at least a portion of the time that it is in service.

In one aspect, the fuel cell is configured to not be connected to a fuel delivery system during at least a portion of the time that it is in service.

In another aspect, the first chamber is filled at least partially (e.g., completely) with a liquid (or at least fluid) fuel and the second chamber is filled at least partially (e.g., completely) with a liquid (or at least fluid) electrolyte.

In yet another aspect, the casing is configured to be capable of being substantially liquid-tight regardless of orientation (preferably, however, the casing is not gas-tight).

In a further aspect, the liquid fuel comprises a (monohydric or polyhydric) lower alcohol and/or $LiAlH_4$, $KBH_4$, $NaBH_4$, $LiBH_4$, $(CH_3)_3NHBH_3$, $NaAlH_4$, $NaCNBH_3$, $CaH_2$, $LiH$, $NaH$, $KH$, $Na_2S_2O_3$, $Na_2HPO_3$, $Na_2HPO_2$, $K_2S_2O_3$, $K_2HPO_3$, $K_2HPO_2$, $NaCOOH$, $KCOOH$ or any combination of two or more thereof.

In another aspect, the liquid electrolyte comprises an aqueous inorganic hydroxide, for example, an alkali metal hydroxide such as, e.g. potassium hydroxide.

In still other aspects, the cathode comprises an air-breathing cathode and/or the anode comprises a metal that is capable of catalyzing the electrochemical oxidation of the liquid fuel.

In a further aspect, the fuel cell does not comprise a membrane.

In yet another aspect, the first chamber is capable of holding up to about 2000 ml of liquid (fluid) fuel, e.g., from about 1 to about 1000 ml of liquid fuel and/or the second chamber is capable of holding up to about 1000 ml of liquid fuel, e.g., from about 0.5 to about 500 ml of liquid fuel.

According to another aspect, the free inner volume of the fuel cell is up to about 4000 ml, e.g., from about 1.5 to about 3000 ml.

In another aspect, the casing has outer surfaces that are of a generally rectangular shape and/or the largest outer dimension of the casing is not larger than about 50 cm.

In still another aspect, the useful surface area of the cathode and/or the anode is from about 0.5 to about 500 $cm^2$.

According to yet another aspect, at least some parts of the casing are made of a plastic material. Non-limiting examples thereof are a polyolefin (e.g., polyethylene, polypropylene) polycarbonate, polyvinylchloride, acrylonitrile-butadiene-styrene (ABS) terpolymer, polyurethane, polytetrafluoroethylene, silicone rubber and any combination of two or more thereof, provided, of course, these materials can withstand the chemical attack by the liquids they may come into contact with.

In another aspect, at least some parts of the casing are made of a metal and/or a metal alloy. Non-limiting examples thereof are stainless steel, nickel, chromium, titanium and any combination of two or more thereof.

In a still another aspect, the casing comprises at least one sealable opening for each of the first and second chambers, e.g., two sealable openings for each of the first and second chambers. These two sealable openings for each chamber may, for example, be disposed at or close to opposite ends of the respective chamber.

In another aspect, the casing is capable of being subjected to multiple opening and resealing operations. For example, the sealable openings may comprise valves.

In still another aspect, the second surface of the anode and the first surface of the cathode are substantially parallel to each other.

In a further aspect, the fuel cell comprises one first chamber and one second chamber; or one first chamber and two second chambers; or two first chambers and two second chambers.

In another aspect, the fuel cell comprises more than one cathode, more than one anode and more than one second chamber for holding liquid electrolyte. For example, the fuel cell may comprise first and second anodes, first and second cathodes, a single chamber for holding liquid fuel and first and second chambers for holding liquid electrolyte. By way of non-limiting example, in this embodiment the first chamber for holding liquid electrolyte may be defined at least partially by the first cathode and the first anode, the second chamber for holding liquid electrolyte may be defined at least partially by the second cathode and the second anode, and the fuel chamber may be defined at least partially by the first and second anodes.

In another aspect, the casing comprises at least one sealable opening for allowing gas generated during the operation of the fuel cell to escape to the surrounding atmosphere.

In yet another aspect, the fuel cell further comprises an ancillary power supply device for peak power requirements, for example, a supercapacitor.

The present invention also provides a self-contained, refreshable fuel cell comprising at least one cathode, at least one anode and at least one first and second chamber as set forth above. The first and second chambers each have at least one sealable opening for replacing spent liquid by fresh liquid, for example, two sealable openings, one opening for discharging spent liquid and another opening for filling the first (second) chamber with fresh liquid.

The present invention further provides a cartridge for refreshing the fuel cell set forth above. The cartridge comprises at least one fuel chamber that is filled at least partially (e.g., substantially completely) with the liquid (fluid) fuel and/or at least one electrolyte chamber that is filled at least partially (e.g., substantially completely) with the liquid (fluid) electrolyte.

In one aspect, the fuel and electrolyte chambers each have at least one sealable opening, for example, two sealable openings (e.g., at or close to opposite ends of the chambers). These sealable openings may comprise, e.g., valves.

In another aspect of the cartridge, the liquid fuel and/or the liquid electrolyte contained therein is the same or similar to the liquid fuel/liquid electrolyte used for the fuel cell set forth above.

In still another aspect of the cartridge, a fuel chamber thereof is capable of holding up to about 2500 ml of liquid fuel, e.g., from about 1.5 to about 1250 ml of liquid fuel, and/or an electrolyte chamber thereof is capable of holding up to about 1500 ml of liquid electrolyte, e.g., from about 1 to about 750 ml of liquid electrolyte.

In a further aspect, the free inner volume of the cartridge is up to about 5000 ml, e.g., from about 2 to about 4000 ml.

In yet another aspect, the outer surfaces of the cartridge are of a generally rectangular shape and/or the largest outer dimension of the cartridge is not larger than about 50 cm.

In another aspect, at least some parts of the cartridge are made of a plastic material. Non-limiting examples thereof are a polyolefin (e.g., polyethylene, polypropylene), polycarbonate, polyvinylchloride, acrylonitrile-butadiene-styrene (ABS) terpolymer, polyurethane, polytetrafluoroethylene, silicone rubber and any combination of two or more thereof, provided, of course, these materials can withstand the chemical attack by the liquids they may come into contact with.

In still another aspect, the cartridge comprises one fuel chamber and one electrolyte chamber; or one fuel chamber and two electrolyte chambers; or two fuel chambers and two electrolyte chambers.

The present invention furthermore provides a packaged combination of a plurality of cartridges as set forth above, wherein the combination comprises at least one first cartridge filled at least partially (e.g., substantially completely) with the liquid (fluid) fuel and at least one second cartridge filled at least partially (e.g., substantially completely) with the liquid (fluid) electrolyte. For example, the combination may comprise 1 to about 20 first cartridges and one second cartridge.

The present invention furthermore provides a fuel cell combination comprising the fuel cell as set forth above (including the various aspects thereof) and a cartridge for refreshing at least one of the liquid fuel and the liquid electrolyte contained in the fuel cell. The cartridge may be a cartridge as set forth above (including the various aspects thereof).

In one aspect, the chambers of the fuel cell and the chamber(s) of the cartridge each have at least one sealable opening. The sealable openings of the chambers of the fuel cell and the sealable opening(s) of the chamber(s) of the cartridge may be configured to be capable of forming a liquid-tight passageway for liquid flowing between a chamber of the fuel cell and the corresponding chamber of the cartridge.

In another aspect, each chamber of the fuel cell and each chamber of the cartridge has two sealable openings which are disposed at or close to opposite ends of the respective chamber.

In yet another aspect, the sealable openings of each chamber of the fuel cell and the sealable openings of each chamber of the cartridge are disposed with respect to each other to allow a substantially simultaneous flow of spent and refreshening liquids into and out of each chamber.

In a still further aspect, the volume ratio of a chamber of the fuel cell and a chamber of the cartridge corresponding thereto (and/or the volume ratio of the liquid contained in a chamber of the fuel cell and the liquid contained in a chamber of the cartridge corresponding thereto) is from about 1:1 to about 1:1.4.

In yet another aspect of the combination, the cartridge comprises a pumping mechanism for pushing the liquid in a chamber thereof into a corresponding chamber of the fuel cell.

The present invention further provides a method of supplying electrical energy to a device. The method comprises providing a fuel cell as set forth above (including the various aspects thereof) and establishing electrical contact between the device and the fuel cell, the fuel cell being sealed in a substantially liquid-tight manner and not connected to an external fuel delivery system while the fuel cell supplies electrical energy to the device.

The present invention also provides a device connected to the fuel cell as set forth above. The fuel cell is sealed in a substantially liquid-tight manner and not connected to an external fuel delivery system. The device may be a portable device and/or an electronic device, e.g., a telecommunications device.

In one aspect, the device is a cellular phone, portable computer, PDA, audio device, video device, medical device or a component thereof. For example, the device may have a power capacity of up to about 150 W.

The present invention furthermore provides a method of refreshing a self-contained fuel cell as set forth above. The method comprises providing a cartridge as set forth above wherein each of the fuel and electrolyte chambers has at least one sealable opening that is configured to be capable of establishing a liquid-tight passageway when contacted with a sealable opening of the corresponding chamber of the fuel cell; contacting the sealable openings of a chamber of the fuel cell and a corresponding chamber of the cartridge to establish a substantially liquid-tight passageway between the chambers;

and allowing and/or causing the liquid contained in a chamber of the cartridge to flow into a corresponding chamber of the fuel cell and vice versa.

As set forth above, the fuel cell of the present invention is configured to be sealed in a substantially liquid-tight manner during at least a portion of the time that it is in service (e.g., during the entire time it is in use). In other words, the fuel cell is not dependent on an external supply of fuel/electrolyte, but is self-contained, i.e., is comparable to a conventional battery in this regard. A conventional battery includes a metal as an integral source of energy. The fuel cell of the present invention, on the other hand, is configured to contain a liquid (fluid) fuel as an integral source of energy, wherefore it does not have to be connected to a fuel delivery system when it is in service. Whereas a conventional battery needs to be replaced once it is exhausted (the metal is used up), with the fuel cell of the present invention only the energy source needs to be replaced, i.e., the fuel cell may be reused after the spent fuel/electrolyte has been replaced by fresh fuel/electrolyte.

The fuel for the fuel cell of the present invention may be any known liquid (fluid) fuel for fuel cells. By way of non-limiting example, the fuel may comprise a (monohydric or polyhydric) lower alcohol, optionally in combination with a solid fuel such as, e.g., $LiAlH_4$, $KBH_4$, $NaBH_4$, $LiBH_4$, $(CH_3)_3NHBH_3$, $NaAlH_4$, $NaCNBH_3$, $CaH_2$, $LiH$, $NaH$, $KH$, $Na_2S_2O_3$, $Na_2HPO_3$, $Na_2HPO_2$, $K_2S_2O_3$, $K_2HPO_3$, $K_2HPO_2$, $NaCOOH$, $KCOOH$ or any combination of two or more thereof. The lower alcohol may, for example, be an alcohol having 1 to 6, e.g., 1 to 4 carbon atoms, and, e.g., 1 to 4 OH groups. Non-limiting examples thereof are methanol, ethanol, n-propanol, isopropanol, n-butanol, isobutanol, pentanol, hexanol, ethylene glycol, propylene glycol, glycerol, pentaerythritol and any combination of two or more thereof. The fuel may also comprise a basic compound, e.g., for the purpose of stabilizing the solid fuel. The basic compound may, for example, be an inorganic hydroxide, non-limiting examples whereof are ammonium and (alkali and alkaline earth) metal hydroxides, such as, e.g., NaOH, KOH, LiOH, $NH_4OH$, $Ca(OH)_2$ and $Mg(OH)_2$.

The liquid (fluid) electrolyte for use in the present fuel cell may comprises a base, for example an aqueous inorganic hydroxide. Non-limiting examples of the inorganic hydroxide are ammonium and (alkali and alkaline earth) metal hydroxides, such as, e.g., NaOH, KOH, LiOH, $NH_4OH$, $Ca(OH)_2$ and $Mg(OH)_2$.

Non-limiting examples of fuels and electrolytes suitable for use in the fuel cell of the present invention are disclosed in U.S. Patent Application Publication Nos. 2002/0083640, 2002/0094459, 2002/0142196, in co-pending U.S. patent application Ser. No. 10/230,204, and U.S. Pat. Nos. 5,599,640 and 5,804,329, the entire disclosures whereof are hereby incorporated herein by reference.

The capacity of the at least one first chamber of the fuel cell of the present invention is not particularly limited. Usually, however, the first chamber will be capable of holding up to about 2000 ml of fuel, e.g., up to about 1500 ml, up to about 1000 ml, up to about 500 ml, up to about 250 ml, up to about 100 ml, up to about 50 ml, or up to about 25 ml of fuel. On the other hand, the first chamber usually will be capable of holding at least about 1 ml of fuel, e.g., at least about 2 ml, at least about 5 ml, at least about 10 ml, at least about 15 ml, or at least about 20 ml of fuel.

The capacity of the at least one second chamber of the fuel cell of the present invention is not particularly limited, either. Usually, however, the second chamber will be capable of holding up to about 1000 ml of electrolyte, e.g., up to about 750 ml, up to about 500 ml, up to about 250 ml, up to about 100 ml, up to about 50 ml, or up to about 25 ml of electrolyte. On the other hand, the second chamber usually will be capable of holding at least about 0.5 ml of electrolyte, e.g., at least about 1 ml, at least about 2 ml, at least about 5 ml, at least about 10 ml, at least about 15 ml, or at least about 20 ml of electrolyte.

The free inner volume of the fuel cell of the present invention (i.e., the inner volume of the fuel cell that is capable of being occupied by gas and/or liquid) is not particularly limited, but usually will be up to about 4000 ml, e.g., up to about 3000 ml, up to about 2000 ml, up to about 1000 ml, up to about 500 ml, up to about 250 ml, up to about 100 ml, or up to about 50 ml. Usually, the free inner volume will not be smaller than about 1.5 ml, e.g., not smaller than about 3 ml, not smaller than about 5 ml, not smaller than about 10 ml, not smaller than about 15 ml, not smaller than about 20 ml, or not smaller than about 25 ml.

The useful surface areas of the cathode(s) and the anode(s) of the fuel cell of the present invention are not particularly limited. Usually, however, in the case of both an anode and a cathode these useful surface areas (i.e., the surface areas that are capable of coming into direct contact with the fuel/electrolyte) are at least about $0.5\ cm^2$, e.g., at least about $2\ cm^2$, at least about $5\ cm^2$, at least about $10\ cm^2$, at least about $20\ cm^2$, or at least about $30\ cm^2$. On the other hand, the useful surface areas usually are not larger than about $500\ cm^2$, e.g., not larger than about $300\ cm^2$, not larger than about $200\ cm^2$, not larger than about $100\ cm^2$, not larger than about $75\ cm^2$, or not larger than about $50\ cm^2$.

The casing of the fuel cell of the present invention may have outer surfaces that are of a generally rectangular shape and the largest outer dimension of the casing may not be larger than about 50 cm. The term "generally rectangular shape" includes shapes which are not perfectly rectangular, e.g., wherein one or more of the angles of the "rectangles" are slightly different from 90° (e.g., between about 80° and about 100°) and/or rectangular shapes having rounded corners and/or edges. Of course, the fuel cell of the present invention may take any non-rectangular shape as well, e.g., a cylindrical shape (e.g., similar to conventional batteries). The "largest outer dimension" of the fuel cell may, for example be any one of, e.g., the height, width, depth and diameter of the fuel cell. This largest outer dimension may, for example, not be larger than about 40 cm, e.g., not larger than about 30 cm, not larger than about 20 cm, not larger than about 15 cm or not larger than about 10 cm. On the other hand, the largest outer dimension usually will not be smaller than about 1 cm, e.g., not smaller than about 2 cm, or not smaller than about 5 cm.

In a preferred embodiment, the casing of the fuel cell of the present invention comprises at least one (substantially) sealable opening for each of its chambers (the term "sealable opening" as used herein includes, and preferably relates to, resealable openings, i.e., the casing is capable of being subjected to multiple opening and resealing operations.). By way of non-limiting example, two sealable openings for each chamber may be disposed, e.g., at or close to two opposite ends of each chamber. The term "close to" is meant to indicate that an opening is spaced apart from one end by not more than about 10% of the entire distance between the opposite ends. A non-limiting example of such a sealable opening is described below in the section "DETAILED DESCRIPTION OF THE PRESENT INVENTION".

In another preferred embodiment of the fuel cell of the present invention, the casing thereof comprises at least one sealable opening for allowing gas generated during the operation of the fuel cell to escape to the surrounding atmosphere. Of course, this sealable opening must be capable of preventing liquid present inside the fuel cell from leaking. A non-limiting example of such a sealable opening is described below in the section "DETAILED DESCRIPTION OF THE PRESENT INVENTION". It is even more preferred for the casing to have two or more such sealable openings so as to facilitate the escape of gas independent of the orientation of the fuel cell.

Moreover, the fuel chamber (and also the electrolyte chamber) of the fuel cell of the present invention may contain a turbulence reducing arrangement for enhancing the laminar flow inside the chamber during a refilling operation. A non-limiting example of such a turbulence reducing arrangement and an explanation of the operation thereof are provided below in the section "DETAILED DESCRIPTION OF THE PRESENT INVENTION".

The fuel cell of the present invention may further comprise, e.g., an ancillary power supply device for peak power requirements, e.g., a supercapacitor. In particular, certain electric and electronic devices require very little electric energy during most of the time they are in operation, but require a substantial amount of energy for short periods of time. While the fuel cell may be capable of satisfying the regular energy demand of the device, its capacity may not be enough for the peak times. The ancillary power supply device (which preferably is charged by the fuel cell itself) can be used to help satisfy this increased, short-term, energy demand.

The cartridge of the present invention comprises at least one fuel chamber that is filled at least partially (e.g., substantially completely) with the liquid (fluid) fuel, at least one electrolyte chamber that is filled at least partially (e.g., substantially completely) with the liquid (fluid) electrolyte, or a combination of one or more fuel chambers and one or more electrolyte chambers.

The fuel and electrolyte chambers each have at least one substantially sealable opening, e.g., two sealable openings, at or close to opposite ends of the chambers. A non-limiting example of such a sealable opening is described below in the section "DETAILED DESCRIPTION OF THE PRESENT INVENTION".

The fuel and/or the electrolyte contained in the cartridge preferably is substantially the same as the fuel/electrolyte originally present in the fuel cell set forth above. It is noted, however, that the composition of the fuel/electrolyte contained in the cartridge does not have to be the same as the composition of the fresh fuel/electrolyte originally present in the fuel cell. The only requirement is that the cartridge fuel/electrolyte for refreshing the fuel cell is capable of keeping the fuel cell operative.

The capacity of a fuel chamber of the cartridge of the present invention is not particularly limited. Usually, however, the fuel chamber will be capable of holding up to about 2500 ml of fuel, e.g., up to about 2000 ml, up to about 1500 ml, up to about 1250 ml, up to about 1000 ml, up to about 750 ml, up to about 500 ml, up to about 250 ml, up to about 100 ml, up to about 50 ml, or up to about 25 ml of fuel. On the other hand, the fuel chamber will usually be capable of holding at least about 1.5 ml of fuel, e.g., at least about 5 ml, at least about 7.5 ml, at least about 10 ml, at least about 15 ml, or at least about 20 ml of fuel.

The capacity of an electrolyte chamber of the cartridge of the present invention is not particularly limited, either. Usually, however, the electrolyte chamber will be capable of holding up to about 1500 ml of electrolyte, e.g., up to about 1250 ml, up to about 1000 ml, up to about 750 ml, up to about 500 ml, up to about 250 ml, up to about 100 ml, up to about 75 ml, up to about 50 ml, or up to about 25 ml of electrolyte. Also, it will usually be capable of holding at least about 1 ml of electrolyte, e.g., at least about 2.5 ml, at least about 5 ml, at least about 7.5 ml, at least about 10 ml, at least about 15 ml, or at least about 20 ml of electrolyte. As a general rule, for refreshing the fuel cell it is preferable to use a slightly higher volume of fuel/electrolyte than the volume of the fuel/electrolyte of the fuel cell that is to be replaced. The excess volume may be used to rinse the fuel chamber/electrolyte chamber, for example to remove any solid deposits which may have formed in the chamber during the operation of the fuel cell. Accordingly, assuming substantially completely filled chambers, a refreshing cartridge for a given fuel cell preferably will comprise a chamber having a volume that is not less than 110%, e.g., not less than 120%, not less than 130%, or even not less than 140% of the volume of the corresponding chamber of the fuel cell.

The (combined) free inner volume of the chamber(s) of the cartridge of the present invention (i.e., the inner volume thereof that is capable of being occupied by gas and/or liquid) is not particularly limited. Usually, however, it will be up to about 5000 ml, e.g., up to about 4000 ml, up to about 3000 ml, up to about 2000 ml, up to about 1000 ml, up to about 500 ml, up to about 250 ml, up to about 100 ml, or up to about 50 ml, and it will usually not be smaller than about 2 ml, e.g., not smaller than about 5 ml, not smaller than about 10 ml, not smaller than about 20 ml, or not smaller than about 30 ml.

The cartridge of the present invention may have outer surfaces that are of a generally rectangular shape and the largest outer dimension of the cartridge may not be larger than about 50 cm. The term "generally rectangular shape" includes shapes which are not perfectly rectangular, e.g., wherein one or more of the angles of the "rectangles" are slightly different from 90° (e.g., between about 80° and about 100°) and/or rectangular shapes having rounded corners and/or edges. Of course, the cartridge of the present invention may take any non-rectangular shape as well, e.g., a cylindrical shape. The "largest outer dimension" of the cartridge may, for example, be any one of, e.g., the height, width, depth and diameter of the cartridge. This largest outer dimension may, for example, not be larger than about 40 cm, e.g., not larger than about 30 cm, not larger than about 20 cm, not larger than about 15 cm or not larger than about 10 cm. On the other hand, the largest outer dimension usually will not be smaller than about 1 cm, e.g., not smaller than about 2 cm, or not smaller than about 5 cm.

The cartridge of the present invention may comprise a single chamber, i.e., a single fuel chamber or a single electrolyte chamber. It may also comprise any combinations thereof, e.g., one fuel chamber and one electrolyte chamber, one fuel chamber and two electrolyte chambers, or two fuel chambers and two electrolyte chambers. Apparently, the configuration and the type/number of individual chambers of the fuel cell that the cartridge is intended for will often determine the configuration and the type/number of individual chambers of the cartridge.

The packaged combination of a plurality of cartridges provided by the present invention comprises at least one first cartridge filled at least partially (e.g., substantially completely) with a liquid fuel and at least one second cartridge filled at least partially (e.g., substantially completely) with a liquid electrolyte. Since in many cases the fuel of a fuel cell will have to be replaced more often than the liquid electrolyte thereof, the combination may comprise 1 to about 20 cartridges (e.g., 2, 3, 4, 5, 6, 7, 8, 9, 10, 12 or 15 cartridges) that contain fuel and a single cartridge that contains electrolyte. Once there is only one fuel cartridge left, the user will know that it is time to replace the electrolyte as well.

In one embodiment of the combination of fuel cell and cartridge according to the present invention, the chambers of the fuel cell and the chamber(s) of the cartridge each have at least one sealable opening. The sealable openings of the chambers of the fuel cell and the sealable opening(s) of the chamber(s) of the cartridge preferably are configured to be capable of forming a liquid-tight passageway for liquid flowing between a chamber of the fuel cell and the corresponding chamber of the cartridge. Preferably, each chamber of the fuel cell and each chamber of the cartridge will have two sealable openings which are disposed at or close to opposite ends of the respective chamber, and the sealable openings of each chamber of the fuel cell and the sealable openings of each chamber of the cartridge are disposed with respect to each other to allow a substantially simultaneous flow of spent and replenishing liquids into and out of each chamber. A non-limiting example of such a combination of sealable openings and the operation thereof is described below in the section "DETAILED DESCRIPTION OF THE PRESENT INVENTION".

Moreover, the cartridge preferably comprises a pumping mechanism for pushing the fluid in a chamber thereof into a corresponding chamber of the fuel cell. A non-limiting example of such a pumping mechanism is described below in the section "DETAILED DESCRIPTION OF THE PRESENT INVENTION".

The fuel cell of the present invention can be used to supply electrical energy to a virtually unlimited number of devices, in particular, electric and electronic devices such as, e.g., (cellular) phones, (portable) computers, PDAs, consumer electronics, (portable) medical devices and components and peripherals thereof (such as, e.g., wireless computer keyboards and mice). As a general rule, the fuel cell of the present invention can be employed for all devices for which conventional batteries (such as, e.g., AA batteries) can be used.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
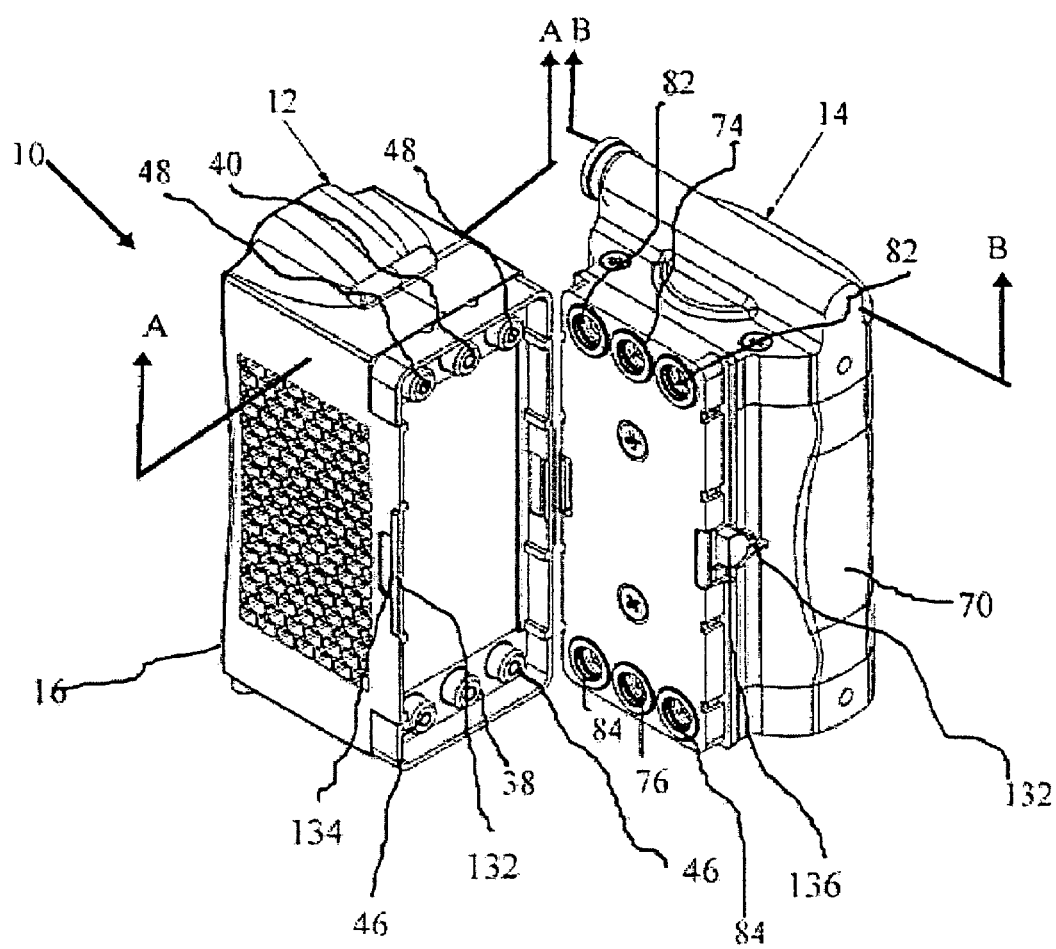
FIG. 1 is a perspective view of a refillable fuel cell system (combination), having a refillable fuel cell and a refilling device (cartridge), that is constructed and operable in accordance with the present invention.

Reference is now made to FIG. 1, which is a perspective view of a refillable fuel cell system 10, having a refillable fuel cell 12 and a refilling device (cartridge) 14, that is constructed and operable in accordance with an aspect of the present invention. As the refillable fuel cell 12 produces electricity, the liquid fuel and the electrolyte of refillable fuel cell 12 are gradually exhausted of their useful components and are defined as spent liquid fuel and spent electrolyte. A non-limiting example of a suitable fuel is a suspension of $NaBH_4$ in an $NaBH_4$ saturated KOH solution, as described in co-pending U.S. application Ser. No. 10/230,204, supra. A non-limiting example of a suitable liquid electrolyte is KOH solution. The spent liquid fuel and the spent electrolyte are removed from refillable fuel cell 12 and a replacement liquid fuel and a replacement electrolyte are introduced into refillable fuel cell 12 by refilling device 14. In accordance with a preferred embodiment of the present invention, the spent liquids are removed from refillable fuel cell 12 into refilling device 14 and replacement liquids are inserted by refilling device 14 into refillable fuel cell 12 substantially simultaneously. Moreover, refilling device 14 stores the spent liquids in substantially the same volume that the replacement liquids were stored. However, it should be noted that fuels and electrolyte are still maintained in separate volumes within refilling device 14. In accordance with another embodiment of the present invention, the removal of the spent liquids and the insertion of the replacement liquids are not performed simultaneously. In accordance with yet another embodiment of the present invention, the refilling device 14 stores the spent liquids and the replacement liquids in separate volumes.

Figure 2:
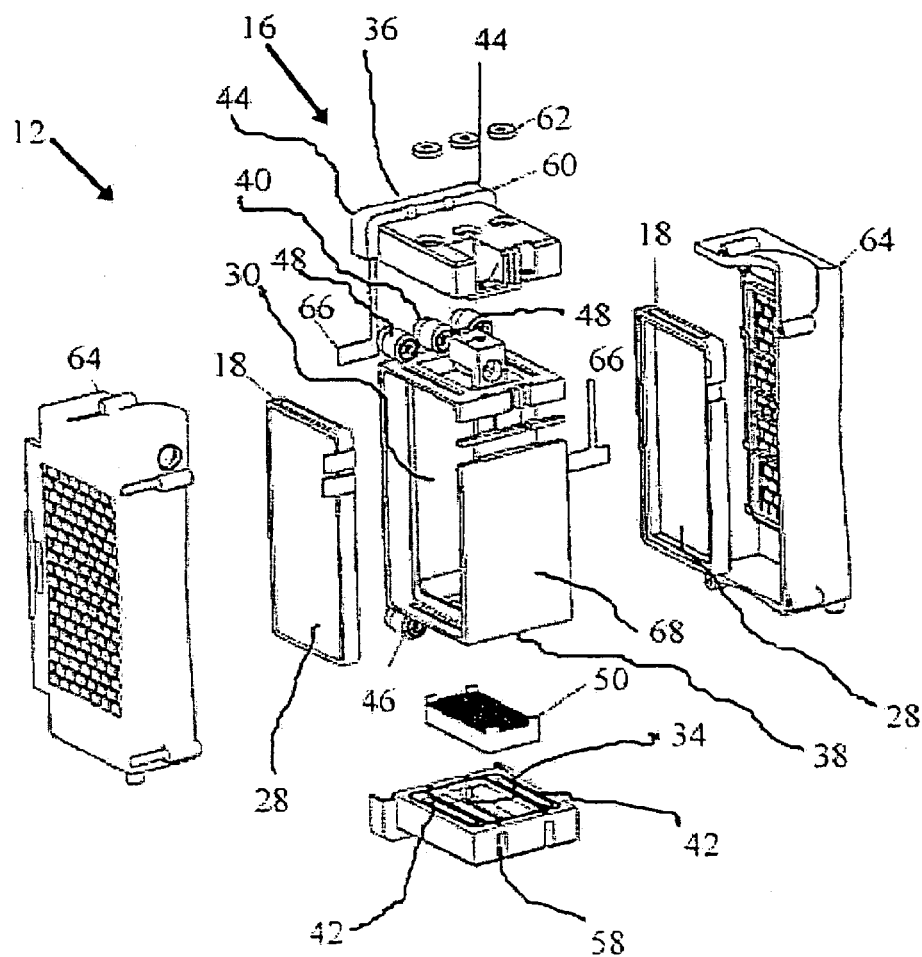
FIG. 2 is an exploded perspective view of the refillable fuel cell of FIG. 1.
Figure 3:
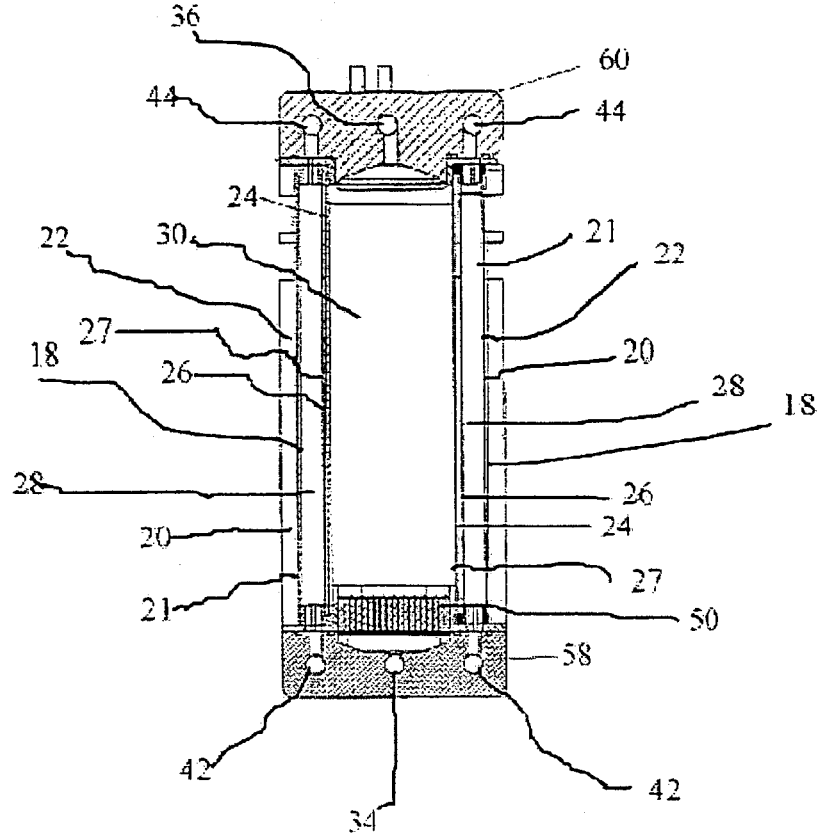
FIG. 3 is a cross-sectional view of the refillable fuel cell of FIG. 1 through a plane which is parallel to lines A-A.

Reference is now made to FIGS. 2 and 3. FIG. 2 is an exploded perspective view of refillable fuel cell 12. Refillable fuel cell 12 has a fuel cell assembly 16. Fuel cell assembly 16 includes two electrode assemblies 18, which share a common fuel chamber 30. The choice of the number of electrode assemblies and their dimensions are design considerations which depend on the required electrical output, as will be apparent to one of ordinarily skilled in the art. Fuel cell assembly 16 also includes a bottom housing (casing) portion 58, a top housing (casing) portion 60, three gas evacuation devices 62, two side casings 64, a central housing (casing) portion 68 and a plurality of conductive plates 66.

Reference is now made to FIG. 3, which is a cross-sectional view of refillable fuel cell 12 of FIG. 1 through a plane which is parallel to lines A-A. In this embodiment, each electrode assembly 18 includes a cathode 22 having two surfaces 20, 21. At least 80% of surface 20 is exposed to air. Each electrode assembly 18 also includes an anode 24 having two surfaces 26, 27. Fuel cell assembly 16 preferably also includes two electrolyte chambers 28. Each electrolyte chamber 28 contains an electrolyte and preferably is defined at least partially by bottom housing portion 58, top housing portion 60, surface 21 of cathode 22 and surface 26 of anode 24. Fuel chamber 30, which contains a liquid fuel, is disposed between electrolyte chambers 28. Fuel chamber 30 is defined at least partially by bottom housing portion 58, top housing portion 60, surfaces 27 of anode 24, which faces out of electrode assemblies 18. Fuel chamber 30 preferably has two openings, a lower opening 34 and an upper opening 36. Reference is again made to FIG. 2. Lower opening 34 preferably is provided with a normally-sealed fluid transfer port, exemplified by a valve 38, and upper opening 36 is provided with a normally-sealed fluid transfer port, exemplified by a valve 40. Valve 38 and valve 40 are normally sealed. Valve 38 is disposed below the fluid level of the liquid fuel in fuel chamber 30. Valve 38 is disposed in the lower section of fuel chamber 30 and valve 40 is disposed in the upper section of fuel chamber 30. This, together with other precautions described below, helps to ensure that, when valve 38 and valve 40 are open and a replacement liquid fuel is introduced into fuel chamber 30 via valve 38 and the existing liquid fuel is removed from fuel chamber 30 via valve 40, the replacement liquid fuel and the existing liquid fuel flow in a substantially laminar manner within fuel chamber 30 which helps reduce mixing of the existing and the replacement liquid fuel. This concept can also be understood by defining the majority of the flow of the existing and replacement liquid fuel flowing through chamber 30 by a plurality of substantially parallel primary flow vectors. The distance between valve 38 and valve 40 measured parallel to the primary flow vectors is generally equal to the maximum dimension of chamber 30 measured parallel to the primary flow vectors. Fuel cell assembly 16 also includes a turbulence reducing arrangement 50 which further enhances laminar flow, as described above, within fuel chamber 30. Turbulence reducing arrangement 50 will be described below in more detail with reference to FIG. 4. Electrolyte chamber 28 is generally similar to fuel chamber 30. For example, each electrolyte chamber 28 has two openings, a lower opening 42 and an upper opening 44 (FIG. 3). Lower opening 42 is provided with a valve 46 and upper opening 44 is provided with a valve 48. Valve 46 and valve 48 are perform similar functions to valve 38 and valve 40 of fuel chamber 30, respectively.

Figure 4:
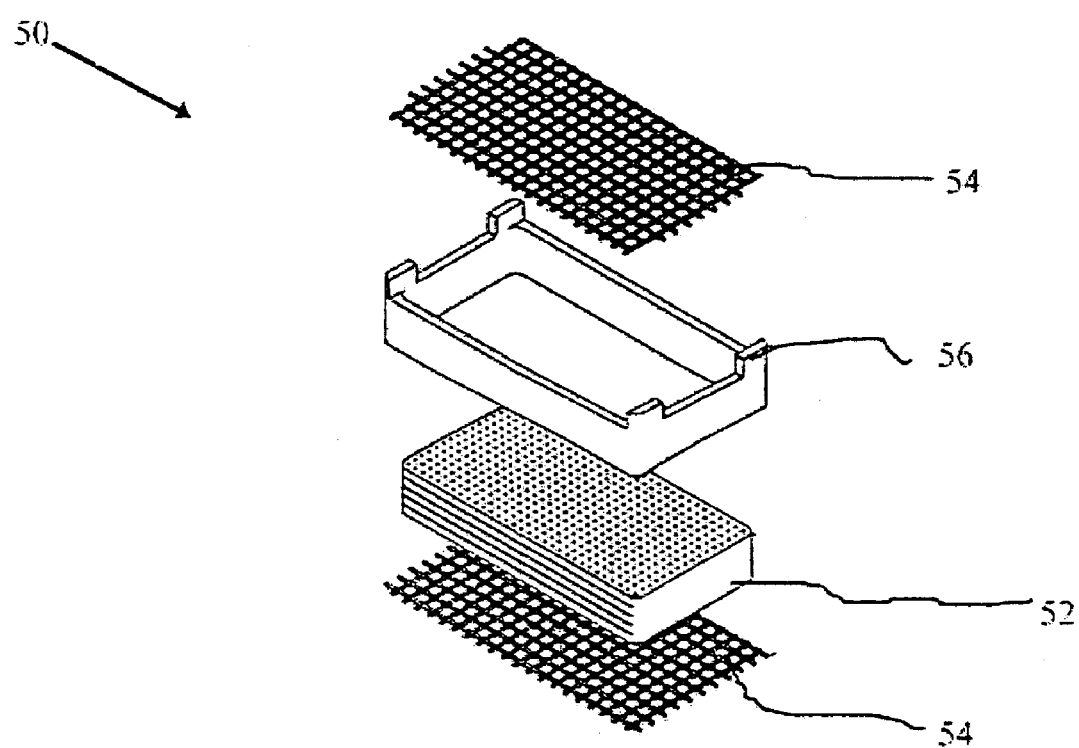
FIG. 4 is an exploded perspective view of a turbulence reducing 10 arrangement of the refillable fuel cell of FIG. 2.

Reference is now made to FIG. 4, which is an exploded perspective view of turbulence reducing arrangement 50. Turbulence reducing arrangement 50 is disposed within fuel chamber 30. In the case shown here where filling is from the bottom of the chambers, turbulence reducing arrangement 50 is preferably close to the bottom of the chamber, i.e., near the inlet (see FIGS. 2, 3). Turbulence reducing arrangement 50 may be implemented in many ways including, but not limited to, a layer of permeable material 52, such as permeable foam, which provides hydraulic damping. By way of a non-limiting example, the permeable foam can be non-woven polypropylene foam with a weight of between 80 and 100 grams per square meter. In the example shown here, layer of permeable material 52 is disposed between two mesh layers 54 which serve to retain layer of permeable material 52. Layer of permeable material 52 and mesh layers 54 are held in place by a frame 56. Turbulence reducing arrangement 50 is disposed horizontally within fuel chamber 30, i.e., generally substantially perpendicular to the primary direction of fluid flow during refilling. When valve 38 (FIG. 2) and valve 40 (FIG. 2) are open and a replacement liquid is introduced into fuel chamber 30, layer of permeable material 52 helps disperse the replacement liquid fuel which is entering fuel chamber 30 across fuel chamber 30 to promote laminar flow of the replacement liquid fuel. It should be noted that all orientations, for example: bottom, horizontal etc., are used for the sake of brevity assuming the device is standing upright as shown, but, the invention can alternatively be implemented in other orientations.

Referring briefly to FIG. 2, it will be appreciated that gases accumulate in chamber 30 and chambers 28. These accumulated gases need to be evacuated from refillable fuel cell 12 without allowing any of the liquids to escape. Therefore, one gas evacuation device 62 is disposed above each of chamber 30 and chambers 28. Each gas evacuation device 62 is configured to enable escape of accumulated gas and to prevent escape of liquids. Gas evacuation device 62 may be implemented as any suitable opening or valve which equalizes gas pressure while preferably providing protection against spillage of the liquids within the chambers.

Figure 5A:
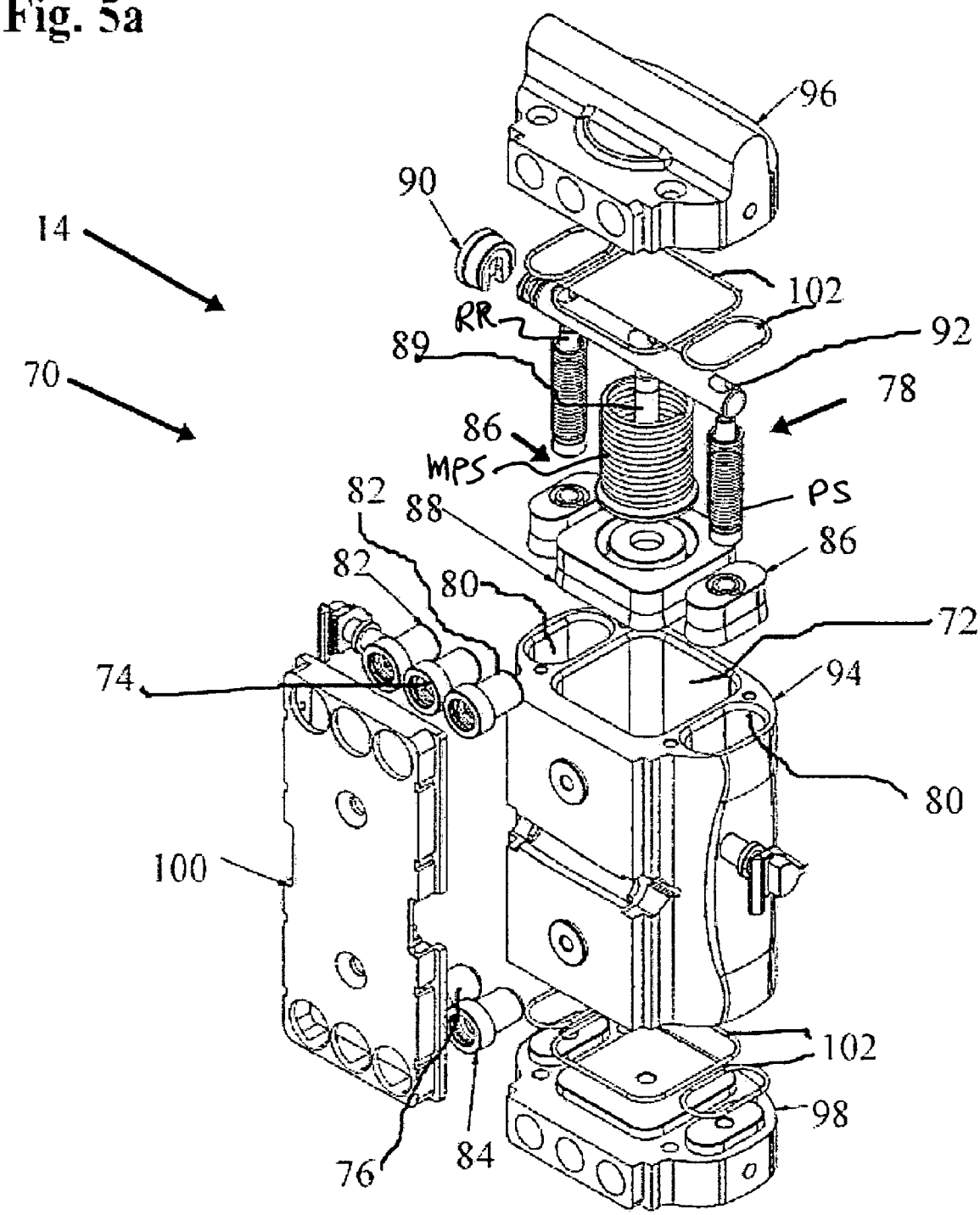
FIG. 5a is an exploded perspective view of the refilling device of FIG. 1.
Figure 5B:
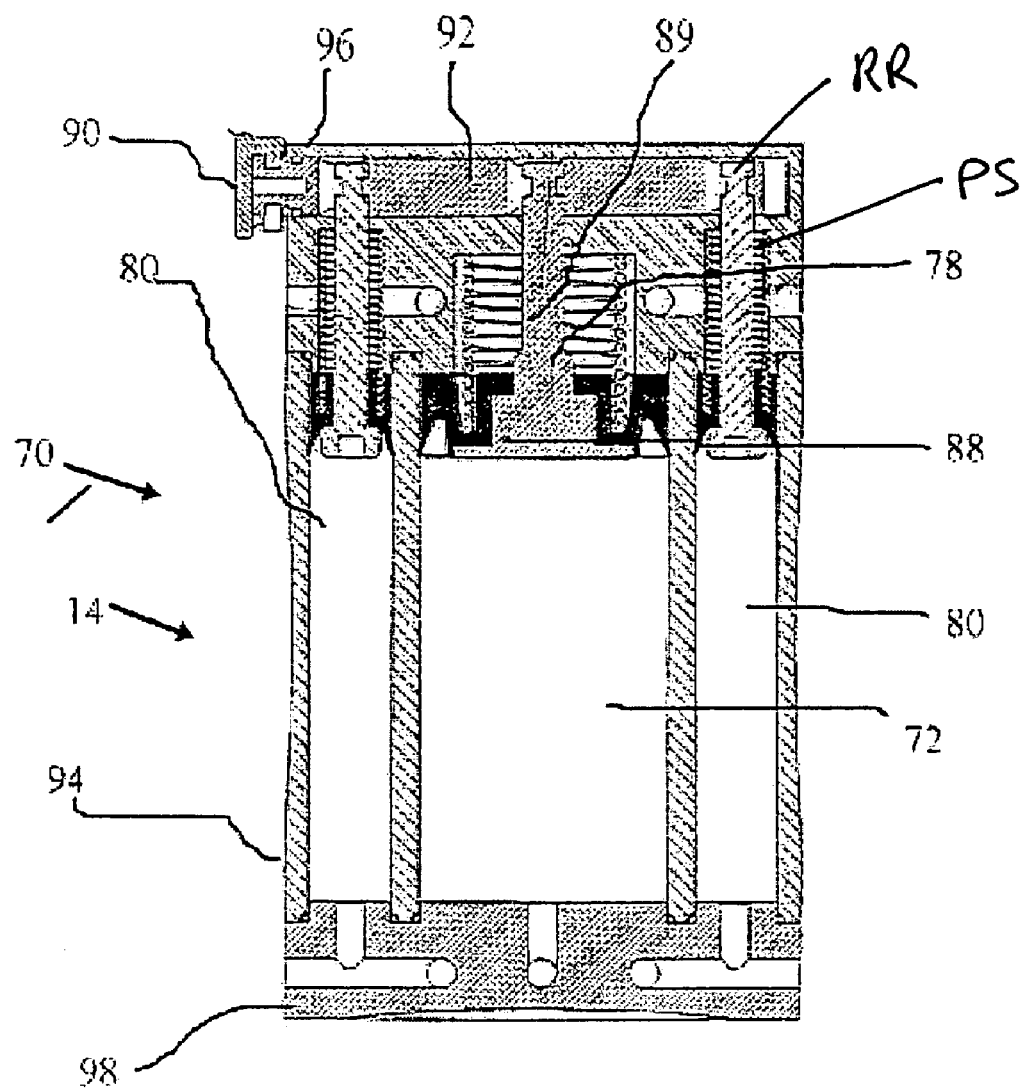
FIG. 5b is a cross-sectional view of the refilling device of FIG. 1 through a plane which is parallel to lines B-B.

Reference is now made to FIG. 5a, which is an exploded perspective view of refilling device 14. FIG. 5b is a cross-sectional view of the refilling device of FIG. 1 through a plane which is parallel to lines B-B. Refilling device 14 has the form of a fluid replacement assembly 70. Fluid replacement assembly 70 has a main body 94, a top housing portion 96, a bottom housing portion 98, a front cover 100 and a plurality of sealing gaskets 102. Fluid replacement assembly 70 includes a parallel-walled chamber 72 containing a replacement liquid fuel. Chamber 72 is mainly defined by main body 94, top housing portion 96 and bottom housing portion 98. Chamber 72 has an upper valve 74 and a lower valve 76. Upper valve 74 is configured for coupling with valve 40 (FIG. 2) and lower valve 76 is configured for coupling with valve 38 (FIG. 2). Chamber 72 also includes a fluid flow actuating arrangement 78 which is configured to substantially simultaneously remove the spent liquid fuel from refillable fuel cell 12 via valve 74 and supply the replacement liquid fuel to refillable fuel cell 12 via valve 76. Fluid flow actuating arrangement 78 includes a piston 88 which is configured to move vertically within chamber 72 (i.e., to slide up and down within the chamber 72 in a sealed manner). Upper valve 74 is disposed near the top of chamber 72 and lower valve 76 is disposed near the bottom of chamber 72 such that, when lower valve 76 and upper valve 74 are open, the spent liquid fuel entering chamber 72 via upper valve 74 is kept substantially separate from the replacement fluid exiting chamber 72 via lower valve 76 by piston 88. Piston 88 is spring loaded by a main piston spring MPS which in this case is a circular wire spring. Piston 88 also includes a main retaining rod 89 which is generally interlocked with a shaped slot in a release bar 92. Retaining rod 89 and release bar 92 are collectively defined as a retaining arrangement. Retaining rod 89 is released by lateral displacement of release bar 92 causing a release of piston 88. A safety lock 90 prevents releasing of piston 88 by accidentally displacing release bar 92. Fluid replacement assembly 70 also includes two parallel walled chambers 80 containing a replacement electrolyte. Two chambers 80 are mainly defined by main body 94, top housing portion 96 and bottom housing portion 98. Each chamber 80 has an upper valve 82 and a lower valve 84. Upper valves 82 are configured for coupling with valves 48 (FIG. 2) and lower valves 84 are configured for coupling with valves 46 (FIG. 2). Each chamber 80 also includes a fluid flow actuating arrangement (pumping mechanism) 86 which is configured to substantially simultaneously remove spent electrolyte from refillable fuel cell 12 via valve 82 and supply replacement electrolyte to refillable fuel cell 12 via valve 84. Fluid flow actuating arrangement 86 and upper valve 82 and lower valve 84 can also be configured substantially the same as the corresponding elements of chamber 72. Each piston 86 is also spring loaded by a piston spring PS which in this case is a circular wire spring. Piston 86 also includes a retaining rod RR which is generally interlocked with a shaped slot in a release bar 92. It will be apparent to those skilled in the art that refilling device 14 can be used to replace other liquids. Additionally, refilling device 14 can be implemented with one or more chambers.

In particularly preferred implementations, refilling device 14 is implemented as a disposable device produced primarily from lightweight low-cost materials. For this reason, at least the main body of the device (main body 94, top housing portion 96 and bottom housing portion 98) are preferably made of polymer materials which are suitable to withstand exposure to the chemicals used. In practice, substantially all components of the refilling device 14 (other than those with specific mechanical requirements such as springs) are preferably made from such polymer materials.

Figure 6:
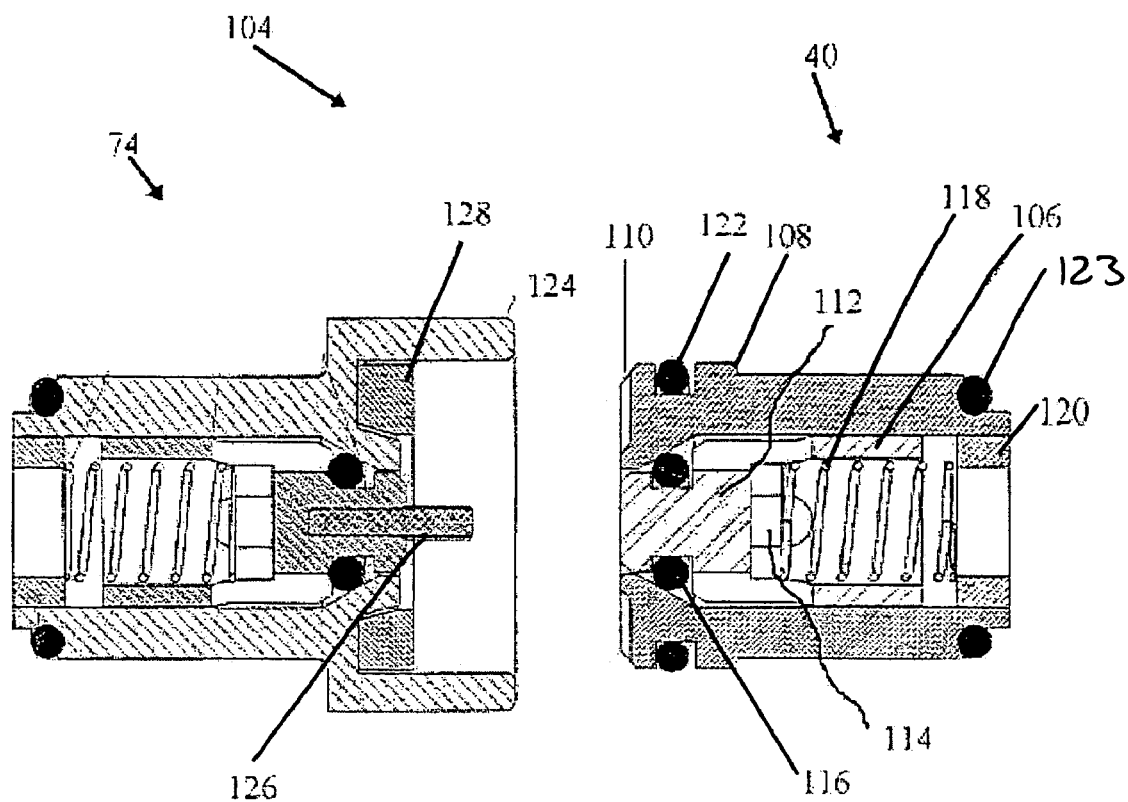
FIG. 6 is an axial sectional view of a valve arrangement, prior to coupling, for use with the refillable fuel cell system of FIG. 1.
Figure 7:
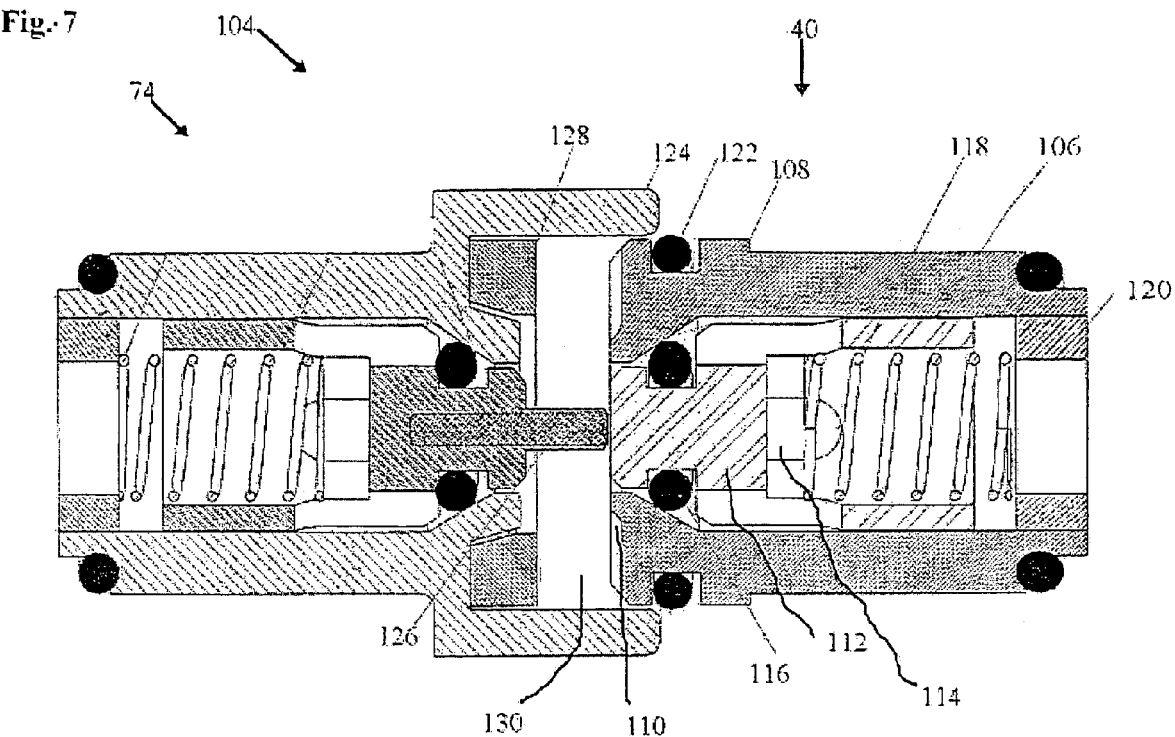
FIG. 7 is an axial sectional view of the valve arrangement of FIG. 6 which is partially coupled.
Figure 8:
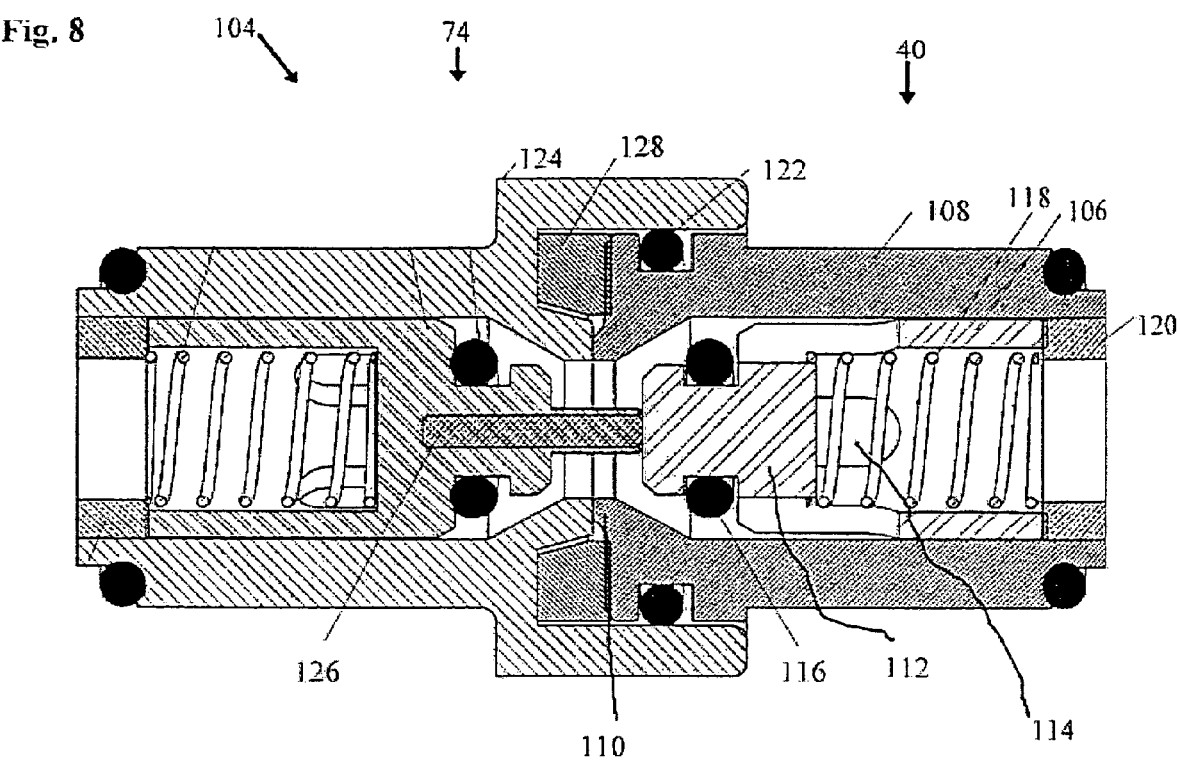
FIG. 8 is an axial sectional view of the valve arrangement of FIG. 6 which is fully coupled.

Reference is now made to FIGS. 6, 7 and 8. It will be understood that the liquid transfer ports and docking ports of the fuel cell and refilling device, respectively, are configured to mate in order to allow replacement of the fuel cell liquids, and must reseal on separation to prevent leakage of the contained liquids from either device. To this end, the preferred features of these ports include reliable non-drip mating and resealing, while maximizing flow rates as much as possible when open. It will be understood that any ports which provide these features may be used. Preferred examples include, but are not limited to, mechanically interlocking valves and self-sealing plugs pierced by hollow needles. One particularly preferred implementation will now be exemplified with reference to FIGS. 6-8.

FIG. 6 is an axial sectional view of a valve arrangement 104, prior to coupling, for use with refillable fuel cell system 10 of FIG. 1. FIG. 7 is an axial sectional view of valve arrangement 104 of FIG. 6 which is partially coupled. FIG. 8 is an axial sectional view of valve arrangement 104 of FIG. 6 which is fully coupled. By way of introduction, the valves, alternatively described as ports, of the present invention and their coupling, alternatively described as docking, are subject to design constraints which include the following factors. First, the dead space between the valves needs to be minimized to prevent liquids dripping from the exterior of the valves after the liquids have been replaced. Second, other precautions need to be incorporated to prevent dripping. Third, the cross-sectional area of the valves needs to be as large as possible to ensure good flow rates. By way of example, valve arrangement 104 illustrates the coupling of upper valve 74 and valve 40. However, it should be noted that corresponding valves (i.e., valves 76 & 38, 82 & 48, and 84 & 46) of refillable fuel cell 12 and refilling device 14 are configured to operate in substantially the same way as upper valve 74 and valve 40. Valve 40 includes a plunger 112 having an alignment portion 106. Alignment portion 106 is typically a hollow tube. Valve 40 also includes outer tube 108 having a bore which tapers toward an end 110. Plunger 112 and alignment portion 106 are disposed within outer tube 108, plunger 112 being disposed toward end 110. Alignment portion 106 has one or more holes 114 through the side of alignment portion 106. Alignment portion 106 also tapers toward end 110 to enable liquid to pass through holes 114 when valve 40 is open. It should be noted, that when alignment portion 106 is implemented as a hollow tube, holes 114 are needed. However, if alignment portion 106 is implemented in a different way, such as a X-cross-section tail, holes 114 may not be necessary. An O-ring 116 is disposed between plunger 112 and outer tube 108 to ensure a strong seal of valve 40 when valve 40 is closed. O-ring 116 is disposed, as close to end 110 as possible, to minimize any dead space between valve 40 and upper valve 74. Valve 40 also includes a spring 118 and a stop ring 120. Stop ring 120 is mechanically connected to outer tube 108, and spring 118 is disposed between stop ring 120 and the inside of alignment portion 106, such that spring 118 pushes and/or biases alignment portion 106 and plunger 112 toward end 110 to seal valve 40. Valve 40 also has a front outer O-ring 122 disposed on the outer surface of outer tube 108 toward end 110 and a rear outer O-ring 123 arranged at another end of the valve 40.

Upper valve 74 is constructed in a substantially similar way (i.e., internally) as valve 40. Additionally, upper valve 74 includes a receiving port 124 and an opening pin 126. Receiving port 124 is configured to receive outer tube 108 of valve 40 such that, valve 40 and upper valve 74 are sealably coupled by O-ring 122 being in close contact with receiving port 124, prior to either of valve 40 or upper valve 74 opening (FIG. 7). Opening pin 126 is connected to plunger 112 of upper valve 74 such that, when valve 40 and upper valve 74 are pushed together, opening pin 126 causes valves 40, 74 to open (FIG. 8). Once valves 40, 74 are open, liquid can flow through valves 40, 74 via holes 114 in alignment portion 106.

Reference is now made to FIG. 8. Receiving port 124 preferably includes an absorbent member 128 which is disposed between valve 40 and upper valve 74. Absorbent member 128 is deployed to absorb any remaining liquid which is disposed between valve 40 and upper valve 74 after valves 40, 74 are sealed by being pulled apart. Absorbent member 128 has an absorbency capacity with respect to the liquid flowing through valve arrangement 104. For the purpose of the description and claims, the "absorbency capacity" is here defined as the volume of liquid that can be absorbed by member 128 without dripping. To the extent that the absorbency capacity thus defined varies as a function of the liquid composition, water may arbitrarily be chosen as a reference fluid for the purpose of defining this property. Clearly, however, it is the absorbency with respect to the actual liquid fuel which defines the desired characteristics of the system, as described below. Preferred types of material for absorbent member 128 are chosen to have properties such that they expand beyond their initial volume as they absorb liquid, thereby absorbing a volume of liquid greater than the initial external volume of the member. By way of a non-limiting example, absorbent member 128 can be a SIF felt grade hydrophobic foam, which is commercially available from Foamex International (Eddystone, Pa.). When valves 40, 74 are sealed by being pulled apart, they define a dead space 130 therebetween. In particularly preferred implementations of the present invention, the absorbency capacity of absorbent member 128 is greater than or equal to the total dead space volume between the valves at the moment of sealing. This arrangement has been found highly effective in preventing spilling of any liquid residue trapped between valve 40 and valve 74 after valves 40, 74 are sealed. It will be apparent to those skilled in the art that valve arrangement 104 can be used with many applications, especially those applications requiring non-drip valve arrangements with similar design requirements.

Figure 9:
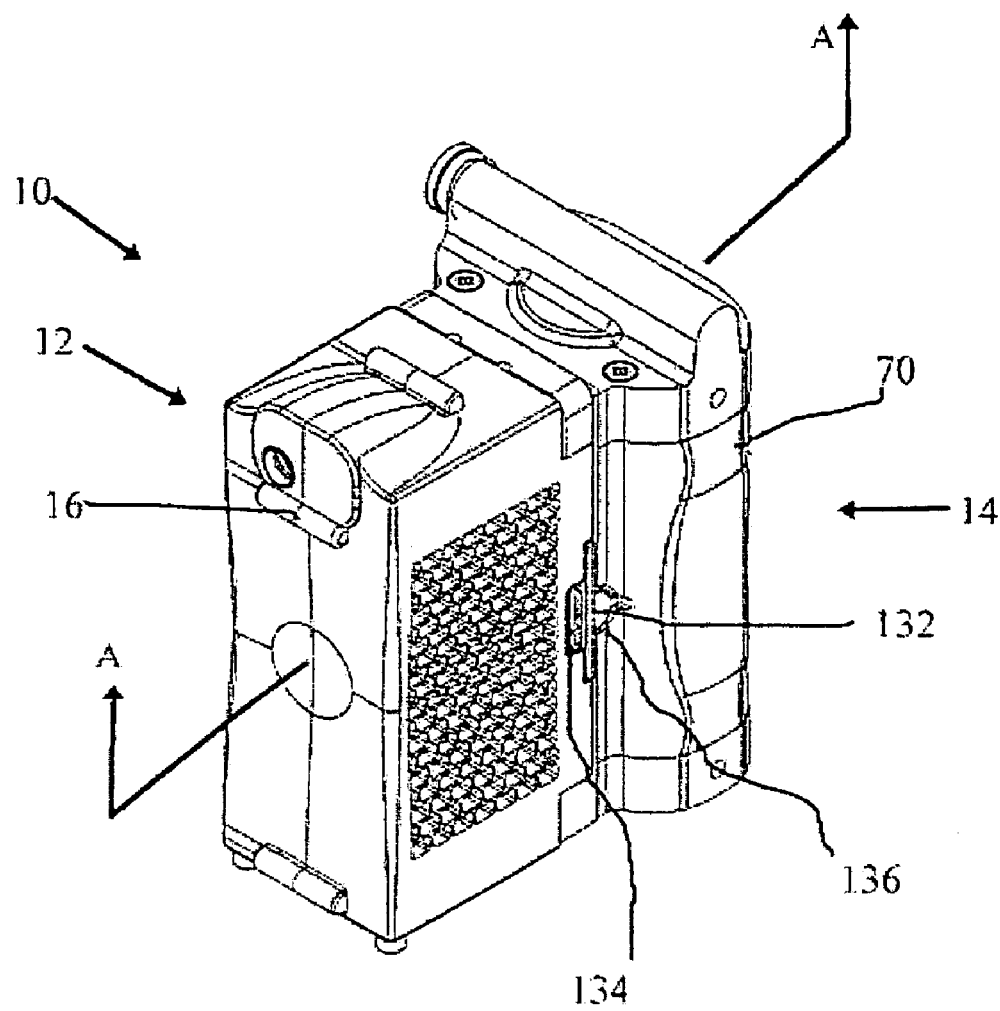
FIG. 9 is a perspective view of the refillable fuel cell system of FIG. 1 which is interlocked.

Reference is now made to FIG. 9, which is a perspective view of refillable fuel cell system 10 of FIG. 1 in an interlocked and connected position. Reference is also now again made to FIG. 1. Refillable fuel cell system 10 has an interlocking mechanism 132. Interlocking mechanism 132 has a component 134 which is mechanically attached to fuel cell assembly 16 of refillable fuel cell 12 and a component 136 which is mechanically attached to fluid replacement assembly 70 of refilling device 14. To begin removing the spent liquids of refillable fuel cell 12 and to refill refillable fuel cell 12 with replacement liquids, valves 38, 40, 46 and 48 of refillable fuel cell 12 are lined up and/or aligned with corresponding valves 74, 76, 82, 84 of refilling device 14. Refillable fuel cell 12 and refilling device 14 are then pushed together and interlocking mechanism 132 is engaged to maintain the pushing together of valves 38, 40, 46, 48, 74, 76, 82, 84. Valves 38, 40, 46, 48, 74, 76, 82, 84 are now open.

Figure 10:
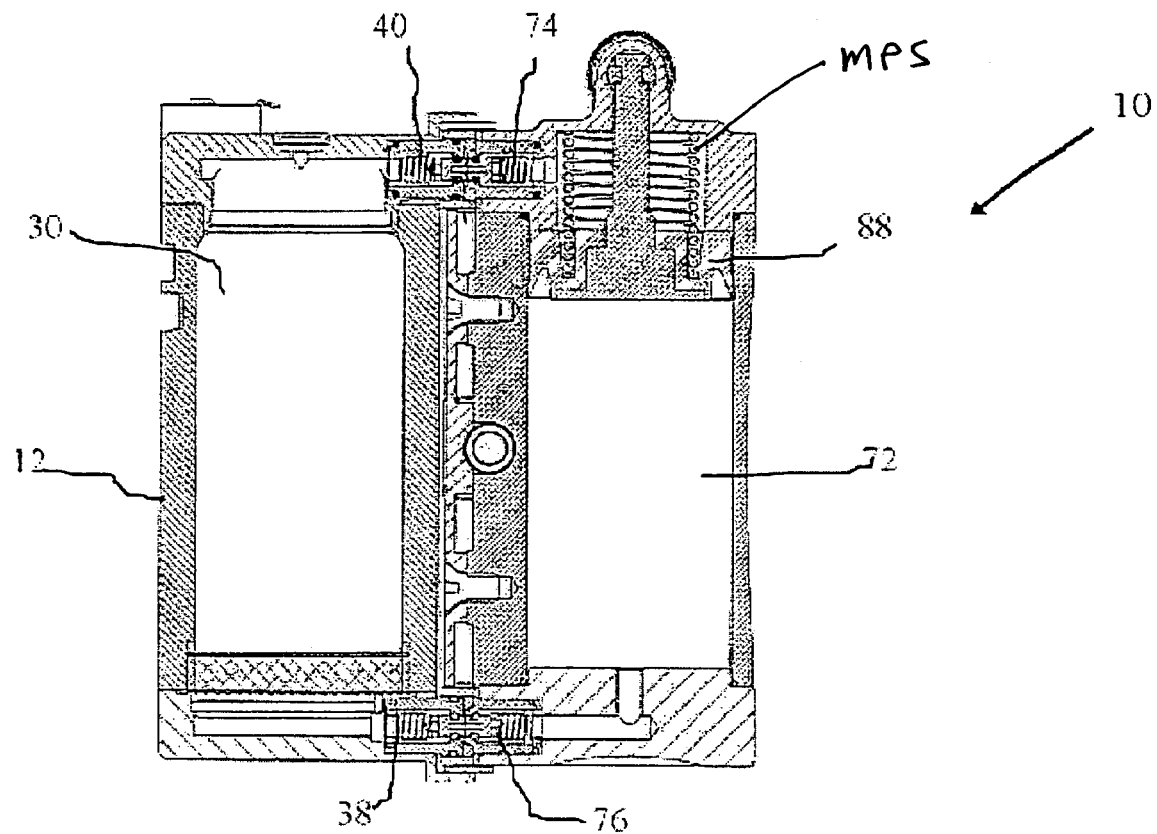
FIG. 10 is a cross sectional view, through a plane which is parallel to lines A-A, of the refillable fuel cell system of FIG. 9 prior to refilling the refillable fuel cell.

Reference is now made to FIG. 10, which is a cross sectional view, through a plane which is parallel to lines A-A, of fuel chamber 30 and chamber 72 of refillable fuel cell system 10 of FIG. 9 prior to refilling refillable fuel cell 12. Once, valves 38, 40, 74, 76, are open, fuel chamber 30 and chamber 72 define a closed fluid system containing the spent liquid fuel and the replacement liquid fuel, respectively. At this point, piston 88 is at the top of chamber 72. Piston 88 substantially prevents the liquids flowing through valves 38, 40, 74, 76.

Figure 11:
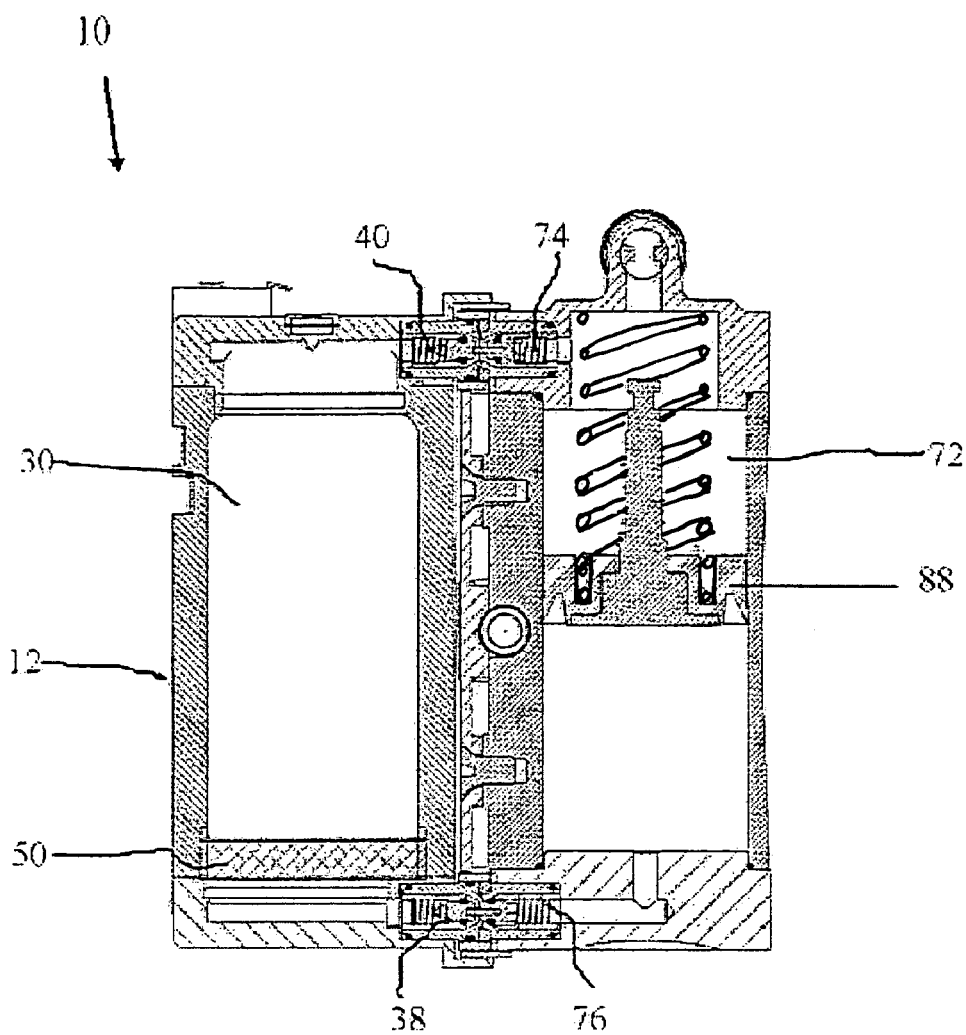
FIG. 11 is a cross sectional view, through a plane which is parallel to lines A-A, of the refillable fuel cell system of FIG. 9 during refilling the refillable fuel cell.

Reference is now made to FIG. 11, which is a cross sectional view, through a plane which is parallel to lines A-A, of fuel chamber 30 and chamber 72 of refillable fuel cell system 10 of FIG. 9 during refilling refillable fuel cell 12. Safety lock 90 (FIGS. 5a, 5b) is removed from release bar 92 (FIGS. 5a, 5b) and then release bar 92 is displaced laterally to release retaining rod 89, thereby releasing spring loaded piston 88. Piston 88 is pushed down through chamber 72 by the spring of piston 88. In this way, piston 88 pushes the replacement liquid fuel out of chamber 72 via lower valve 76 and into fuel chamber 30 via valve 38. The replacement liquid fuel enters fuel chamber 30 via turbulence reducing arrangement 50 which substantially prevents mixing of the spent and the replacement liquid fuels in fuel chamber 30. Substantially simultaneously, piston 88 draws in the spent liquid fuel from fuel chamber 30 via valve 40 of fuel chamber 30 and upper valve 74 of chamber 72. Additionally, the replacement liquid fuel entering fuel chamber 30 pushes the spent liquid fuel upward towards valve 40. Mixing of the spent and replacement liquids is substantially prevented in chamber 72 by piston 88, as described above with reference to FIGS. 5a, 5b. It should also be noted that the spent liquid fuel generally has a lower density than the replacement liquid fuel and therefore it may be advantageous for the replacement liquid fuel to enter fuel chamber 30 from the bottom thereof. However, it will be clear to one of ordinarily skill in the art that the invention can be modified such that, the replacement liquid fuel enters fuel chamber 30 from the top thereof and the spent liquid fuel exits chamber 30 from the bottom thereof.

Figure 12:
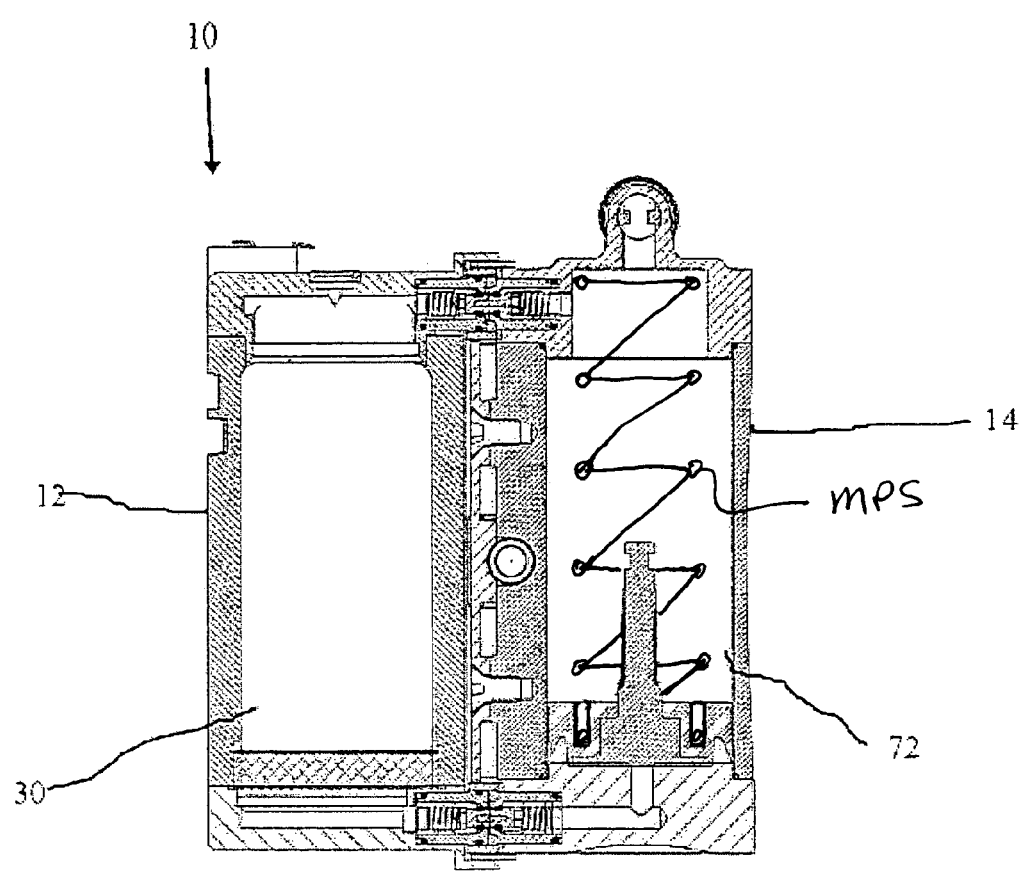
FIG. 12 is a cross sectional view, through a plane which is parallel to lines A-A, of the refillable fuel cell system of FIG. 9 after refilling the refillable fuel cell.

FIG. 12 is a cross sectional view, through a plane which is parallel to lines A-A, of fuel chamber 30 and chamber 72 of refillable fuel cell system 10 of FIG. 9 after refilling refillable fuel cell 12. Refillable fuel cell 12 now contains the replacement liquid fuel and refilling device 14 now contains the spent liquid fuel. Similarly, the spent electrolyte has been removed from refillable fuel cell 12 to refilling device 14 and substantially simultaneously, the replacement electrolyte has been inserted into refillable fuel cell 12 from refilling device 14. The replacement of the spent liquid fuel and the spent electrolyte is performed substantially simultaneously.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A refillable fuel cell comprising:
a casing;
a cathode having a first surface and a second surface;
at least part of the second surface being exposed to the atmosphere;
an anode having a first surface and a second surface;
a first chamber configured to retain liquid fuel, wherein the first chamber is defined at least partially by the first surface of the anode; and
a second chamber configured to retain liquid electrolyte, wherein the second chamber is defined at least partially by the second surface of the anode and the first surface of the cathode,
wherein the fuel cell is configured to be sealed in a substantially liquid-tight manner during at least a portion of its service life,
wherein the fuel cell is configured to at least one of receive fresh liquid and discharge spent liquid via at least one resealable opening, and
wherein the at least one resealable opening comprises two resealable openings each in fluid communication with one of the first and second chambers.

2. The fuel cell of claim 1, wherein the fuel cell is configured to be disconnected from a fuel delivery system during at least a portion of the service life.

3. The fuel cell of claim 1, wherein the casing is configured to be substantially liquid-tight regardless of orientation.

4. The fuel cell of claim 1, wherein the first chamber is filled at least partially with a liquid fuel and the second chamber is filled at least partially with a liquid electrolyte.

5. The fuel cell of claim 4, wherein the liquid fuel comprises a lower alcohol.

6. The fuel cell of claim 4, wherein the liquid fuel comprises at least one of $LiAlH_4$, $KBH_4$, $NaBH_4$, $LiBH_4$, $(CH_3)_3NHBH_3$, $NaAlH_4$, $NaCNBH_3$, $CaH_2$, $LiH$, $NaH$, $KH$, $Na_2S_2O_3$, $Na_2HPO_3$, $Na_2HPO_2$, $K_2S_2O_3$, $K_2HPO_3$, $K_2HPO_2$, $NaCOOH$ and $KCOOH$.

7. The fuel cell of claim 4, wherein the liquid electrolyte comprises an aqueous inorganic hydroxide.

8. The fuel cell of claim 1, wherein the cathode comprises an air-breathing cathode.

9. The fuel cell of claim 1, wherein the anode comprises a metal that is capable of catalyzing an electrochemical oxidation of the liquid fuel.

10. The fuel cell of claim 1, wherein the fuel cell lacks a membrane.

11. The fuel cell of claim 1, wherein the first chamber is configured to retain about 2000 ml of liquid fuel.

12. The fuel cell of claim 11, wherein the first chamber is configured to retain from between about 1 to about 1000 ml of liquid fuel.

13. The fuel cell of claim 1, wherein the second chamber is configured to retain up to about 1000 ml of liquid electrolyte.

14. The fuel cell of claim 13, wherein the second chamber is configured to retain from between about 0.5 to about 500 ml of liquid electrolyte.

15. The fuel cell of claim 1, wherein the casing has a generally rectangular outer shape.

16. The fuel cell of claim 15, wherein a largest outer dimension of the casing is less than or equal to about 50 cm.

17. The fuel cell of claim 1, wherein the fuel cell comprises a free inner volume of about 4000 ml.

18. The fuel cell of claim 17, wherein the free inner volume is between about 1.5 and about 3000 ml.

19. The fuel cell of claim 1, wherein at least one of the cathode and the anode comprises a surface area of between about 0.5 and about 500 $cm^2$.

20. The fuel cell of claim 1, wherein at least a portion of the casing comprises a plastic material.

21. The fuel cell of claim 20, wherein the plastic material comprises at least one of polyolefin, polycarbonate, polyvinylchloride, acrylonitrile-butadiene-styrene terpolymer, polyurethane, polytetrafluoroethylene and silicone rubber.

22. The fuel cell of claim 1, wherein at least a portion of the casing comprises at least one of a metal and a metal alloy.

23. The fuel cell of claim 22, wherein at least a portion of the casing comprises at least one of stainless steel, nickel, chromium and titanium.

24. The fuel cell of claim 1, wherein each the two resealable openings comprises oppositely arranged openings.

25. The fuel cell of claim 1, wherein the casing comprises valves.

26. The fuel cell of claim 1, wherein the second surface of the anode and the first surface of the cathode are substantially parallel to each other.

27. The fuel cell of claim 1, wherein the fuel cell comprises one first chamber and one second chamber.

28. The fuel cell of claim 1, wherein the fuel cell comprises one first chamber and two second chambers.

29. The fuel cell of claim 1, wherein the fuel cell comprises two first chambers and two second chambers.

30. The fuel cell of claim 1, wherein the fuel cell comprises at least another cathode, at least another anode, and another second chamber for retaining liquid electrolyte.

31. The fuel cell of claim 30, wherein the fuel cell comprises another anode, another cathode, a single first chamber and another second chamber.

32. The fuel cell of claim 31, wherein the second chamber is defined by the anode and the cathode and wherein the other second chamber is defined by the other anode and the other cathode.

33. The fuel cell of claim 1, wherein the casing comprises at least one sealable opening for allowing gas generated during an operation of the fuel cell to escape to the atmosphere.

34. The fuel cell of claim 1, wherein the fuel cell further comprises an ancillary power supply device for peak power requirements.

35. The fuel cell of claim 34, wherein the ancillary power supply device comprises a supercapacitor.

36. A self-contained, refillable fuel cell comprising:
a cathode having a first surface and a second surface, at least part of the second surface being exposed to the atmosphere;
an anode having a first surface and a second surface;
a first chamber filled at least partially with a liquid fuel, the first chamber being defined at least partially by the first surface of the anode;
a second chamber filled at least partially with a liquid electrolyte, the second chamber being defined at least partially by the second surface of the anode and the first surface of the cathode;
at least one sealable opening communicating with the first chamber;
at least one other sealable opening communicating with the second chamber; and
a cartridge,
wherein the fuel cell is configured to at least one of receive fresh liquid and discharge spent liquid from and/or to the cartridge via the sealable openings.

37. The fuel cell of claim 36, wherein the first and second chambers each communicate with two sealable openings, one for discharging spent liquid and one receiving fresh liquid.

38. The fuel cell of claim 36, wherein the cartridge comprises at least one of a fuel chamber at least partially filled with liquid fuel and an electrolyte chamber at least partially filled with liquid electrolyte.

39. The fuel cell of claim 38, wherein the cartridge comprises each of the fuel chamber and the electrolyte chamber and wherein the fuel and electrolyte chambers are each in fluid communication with at least one sealable opening.

40. The fuel cell of claim 39, wherein the fuel and electrolyte chambers are each in fluid communication with two oppositely arranged sealable openings.

41. The fuel cell of claim 40, wherein each sealable opening comprises a valve.

42. The fuel cell of claim 38, wherein the liquid fuel comprises a lower alcohol.

43. The fuel cell of claim 42, wherein the lower alcohol comprises at least one of methanol and glycerol.

44. The fuel cell of claim 42, wherein the liquid fuel comprises at least one of $LiAlH_4$, $KBH_4$, $NaBH_4$, $LiBH_4$, $(CH_3)_3NHBH_3$, $NaAlH_4$, $NaCNBH_3$, $CaH_2$, $LiH$, $NaH$, $KH$, $Na_2S_2O_3$, $Na_2HPO_3$, $Na_2HPO_2$, $K_2S_2O_3$, $K_2HPO_3$, $K_2HPO_2$, $NaCOOH$ and $KCOOH$.

45. The fuel cell of claim 38, wherein the liquid electrolyte comprises an aqueous hydroxide.

46. The fuel cell of claim 45, wherein the aqueous hydroxide comprises potassium hydroxide.

47. The fuel cell of claim 38, wherein the fuel chamber is configured to retain up to about 2500 ml of liquid fuel.

48. The fuel cell of claim 47, wherein the fuel chamber is configured to retain from about 1.5 to about 1250 ml of liquid fuel.

49. The fuel cell of claim 38, wherein the electrolyte chamber is configured to retain up to about 1500 ml of liquid electrolyte.

50. The fuel cell of claim 49, wherein the electrolyte chamber is configured to retain from about 1 to about 750 ml of liquid electrolyte.

51. The fuel cell of claim 38, wherein the cartridge comprises a generally rectangular outer shape.

52. The fuel cell of claim 51, wherein a largest outer dimension of the cartridge is not larger than about 50 cm.

53. The fuel cell of claim 38, wherein the cartridge comprises a free inner volume which is equal to or less than about 5000 ml.

54. The fuel cell of claim 53, wherein the free inner volume is between about 2 to about 4000 ml.

55. The fuel cell of claim 38, wherein at least a portion of the cartridge comprise a plastic material.

56. The fuel cell of claim 55, wherein the plastic material comprises at least one of polyolefin, polycarbonate, polyvinylchloride, acrylonitrile-butadiene-styrene terpolymer, polyurethane, polytetrafluoroethylene and silicone rubber.

57. The fuel cell of claim 38, wherein the cartridge comprises one fuel chamber and one electrolyte chamber.

58. The fuel cell of claim 38, wherein the cartridge comprises one fuel chamber and two electrolyte chambers.

59. The fuel cell of claim 38, wherein the cartridge comprises two fuel chambers and two electrolyte chambers.

60. A packaged combination of a plurality of cartridges for refreshing the fuel cell of claim 36, wherein the combination comprises at least one first cartridge filled at least partially with liquid fuel and at least one second cartridge filled at least partially with liquid electrolyte.

61. The packaged combination of claim 60, wherein the combination comprises between about 1 and about 20 first cartridges and one second cartridge.

62. A combination of the fuel cell of claim 36 and a cartridge for refreshing at least one of the liquid fuel and the liquid electrolyte of the fuel cell.

63. The combination of claim 62, wherein the cartridge comprises at least one of a fuel chamber and an electrolyte chamber.

64. The combination of claim 63, wherein at least one of the fuel and electrolyte chambers of the fuel cell and at least one of the fuel and electrolyte chambers of the cartridge are in fluid communication with at least one sealable opening.

65. The combination of claim 64, wherein the at least one sealable opening of one of the fuel and electrolyte chambers of the fuel cell and the at least one sealable opening of one of the fuel and electrolyte chambers of the cartridge are capable of capable of forming a liquid-tight passageway between the fuel cell and the cartridge.

66. The combination of claim 64, wherein each of the fuel and electrolyte chambers of the fuel cell and each of the fuel and electrolyte chambers of the cartridge are in fluid communication with two sealable openings.

67. The combination of claim 65, wherein the cartridge is configured to receive spent liquid fuel and spent liquid electrolyte from the fuel cell via the at least one sealable openings and is configured to introduce fresh liquid fuel and fresh liquid electrolyte into the fuel cell via the at least one sealable openings.

68. The combination of claim 63, wherein a volume ratio of one of the fuel and electrolyte chambers of the fuel cell relative to one of the fuel and electrolyte chambers of the cartridge is between about 1:1 and about 1:1.4.

69. The combination of claim 63, wherein a volume ratio of liquid contained in the fuel cell relative to liquid contained in the cartridge is between about 1:1 and about 1:1.4.

70. The combination of claim 63, wherein the cartridge comprises a pumping mechanism for causing liquid in the cartridge to enter the fuel cell.

71. A fuel cell system comprising:
a fuel cell assembly comprising a cathode having a first surface and a second surface, at least part of said second surface being exposed to air, an anode having a first surface and a second surface, a first chamber configured for containing a liquid fuel, said first chamber being defined at least partially by said first surface of said anode, wherein said first chamber has a first liquid transfer port and a second liquid transfer port, said first and second ports being normally closed, a second chamber configured for containing a liquid electrolyte, said second chamber being defined at least partially by said second surface of said anode and said first surface of said cathode, wherein said second chamber has a third liquid transfer port and a fourth liquid transfer port, said third and said fourth ports being normally closed; and
a cartridge removably connected to the fuel cell.

72. The system of claim 71, wherein each of said first, second, third and fourth ports are configured to open when the cartridge is connected to the fuel cell and are configured to close when the cartridge is disconnected from the fuel cell.

73. The system of claim 71, wherein fuel cell is configured to receive liquid fuel and electrolyte from the cartridge at a bottom portion of the fuel cell and is configured to discharge liquid fuel and electrolyte from a top portion of the fuel cell.

74. The system of claim 71, further comprising a turbulence reducing arrangement disposed within said first chamber, whereby the turbulence reducing arrangement is configured to reduce flow turbulence within said first chamber.

75. The system of claim 74, wherein said turbulence reducing arrangement includes a layer of permeable material.

76. The system of claim 71, wherein the cartridge comprises a first docking port and a second docking port, wherein the fuel cell comprises a third docking port and a fourth docketing port, and wherein said first and second docking ports are configured to be respectfully connected to said third and said fourth docketing ports.

77. The system of claim 71, further comprising at least one absorbent member arranged within a fluid communication passage between the fuel cell and the cartridge.

78. The system of claim 77, wherein the at least one absorbent member is disposed within at least one of said, first, second, third and fourth docking ports, whereby the at least one absorbent member has an absorbency capacity.

79. The system of claim 71, further comprising a locking mechanism for locking together the cartridge and the fuel cell.

* * * * *